United States Patent [19]
Fukui

[11] Patent Number: 4,510,505
[45] Date of Patent: * Apr. 9, 1985

[54] THERMAL PRINTER

[75] Inventor: Hiroshi Fukui, Yokosuka, Japan

[73] Assignee: Canon Kabushiki Kaisha, Tokyo, Japan

[*] Notice: The portion of the term of this patent subsequent to Sep. 27, 2000 has been disclaimed.

[21] Appl. No.: 389,555

[22] Filed: Jun. 17, 1982

[30] Foreign Application Priority Data

Jul. 3, 1981 [JP] Japan .................. 56-103235

[51] Int. Cl.³ ........................... G01D 15/10
[52] U.S. Cl. ................. 346/76 PH; 400/120
[58] Field of Search ........... 219/216; 346/76 PH, 346/135.1; 400/120

[56] References Cited

U.S. PATENT DOCUMENTS

| 4,145,756 | 3/1979 | Cochran et al. | 364/900 |
| 4,219,824 | 8/1980 | Asai | 346/76 PH |
| 4,360,819 | 11/1982 | Saito et al. | 346/76 PH |
| 4,407,003 | 9/1983 | Fukui | 346/76 PH |

Primary Examiner—E. A. Goldberg
Assistant Examiner—Gerald E. Preston
Attorney, Agent, or Firm—Fitzpatrick, Cella, Harper & Scinto

[57] ABSTRACT

There is provided to a thermal printer including a thermal head having a plurality of heating elements and a power supply for driving the thermal head. A power supply average voltage detected and a time period for supplying a voltage to the heating elements is determined based on the detected voltage and the number of heating elements to be simultaneously energized.

12 Claims, 6 Drawing Figures

THERMAL PRINTER

BACKGROUND OF THE INVENTION

1. Field of the Invention

The present invention relates to a thermal printer which keeps a print density at a constant level by controlling a drive pulse, and more particularly to a thermal printer which determines an optimum driving time period, e.g. voltage application time period or energization time period, of a print head in accordance with the number of dots to be simultaneously heated and based on the detected voltage, in order to keep constant the print density irrespective of a change of the voltage applied to the thermal head due to a change of the number of dots to be simultaneously heated.

2. Description of the Prior Art

The print density in the thermal printer is determined by a calorific quantity of dots. In order to attain a uniform print density, it is necessary that a calorific quantity per dot of a thermal head be constant. That is, the calorific quantity per dot given by $$W = V^2 t / R \quad (1.1)$$

where

W (mf) is a calorific quantity per dot,
R ($\Omega$) is a resistance per dot,
V (volt) is an applied voltage per dot, and
t (ms) is a heating time, is constant. For example, when the resistance R per dot is 11 $\Omega$ and the calorific quantity W per dot is 2.1 (mJ), a relation between the applied voltage to the thermal head and the heating time is determined from the equation (1.1) as shown in FIG. 1.

When a dry battery is used as a power supply, the applied voltage to the thermal head decreases as an electromotive force of the dry battery decreases. As a result, the print density for a given heating time is reduced. In the prior art, the print density is kept at a constant level by increasing the heating time as the electromotive force of the dry battery decreases.

For example, a dummy load for a print operation (e.g. a load when the number of simultaneously heated dots is one) is connected to the dry battery and a voltage across the battery is detected to determine an optimum heating time for the detected voltage.

In a thermal printer which uses a four-phase pulse motor as a stepping motor, resistances of two phases of the motor and a resistance determined by the number of dots to be simultaneously heated constitute the load. Table 1 which shows the resistances when the printer is driven shows a variation of the resistances of the printer due to the number of dots to be simultaneously heated.

TABLE 1

| Printer Operation | Printer Resistance R |
| --- | --- |
| Voltage Detection (4-phase excitation) | 7.5Ω |
| 1-dot print (2-phase excitation + 1 dot) | 6.3Ω |
| 2-dot print (2-phase excitation + 2 dots) | 4.0Ω |
| 3-dot print (2-phase excitation + 3 dots) | 2.9Ω |
| 4-dot print (2-phase excitation + 4 dots) | 2.3Ω |
| 5-dot print (2-phase excitation + 5 dots) | 1.9Ω |
| 6-dot print (2-phase excitation + 6 dots) | 1.6Ω |
| 7-dot print (2-phase excitation + 7 dots) | 1.4Ω |
| Remarks | 4-phase pulse motor winding resistance: 30Ω/phase 1 × 7 thermal head: 11Ω/dot |

When the dry battery is used as the power supply, the applied voltage to the thermal head also changes as shown in FIG. 2 because a ratio of an internal resistance of the dry battery and the load resistance changes.

As seen from FIG. 2, the applied voltage to the thermal head significantly changes depending on the number of dots to be simultaneously heated.

In the prior art, however, the applied voltage to the thermal head is determined by connecting the dummy load, thereafter the heating time is determined. Accordingly, the heating time is determined independent of the number of dots to be simultaneously heated, resulting in a variation in the print density. If a plurality of dots are printed with the same heating time as that which is the maximum for the applied voltage to the thermal head when heating one dot, the print density is reduced because the applied voltage to the thermal head when the plurality of dots are heated is lower than that when one dot is heated.

SUMMARY OF THE INVENTION

It is a principal object of the present invention to provide a thermal printer which attains a uniform print density by determining an optimum heating time depending on the number of dots to be simultaneously heated.

It is another object of the present invention to provide a thermal printer which detects a power supply voltage a predetermined number of times to determine a correct power supply voltage by an average voltage thereof, and which determines the heating time taking the number of dots to be simultaneously heated into consideration.

It is a further object of the present invention to provide a thermal printer which detects a power supply voltage by using a motor for driving a thermal head as a dummy load and controls the heating time based on the detected power supply voltage and the number of dots to be simultaneously heated.

The above and other objects of the present invention will be apparent from the following description of the invention.

DETAILED DESCRIPTION OF THE PREFERRED EMBODIMENTS

Figure 3:
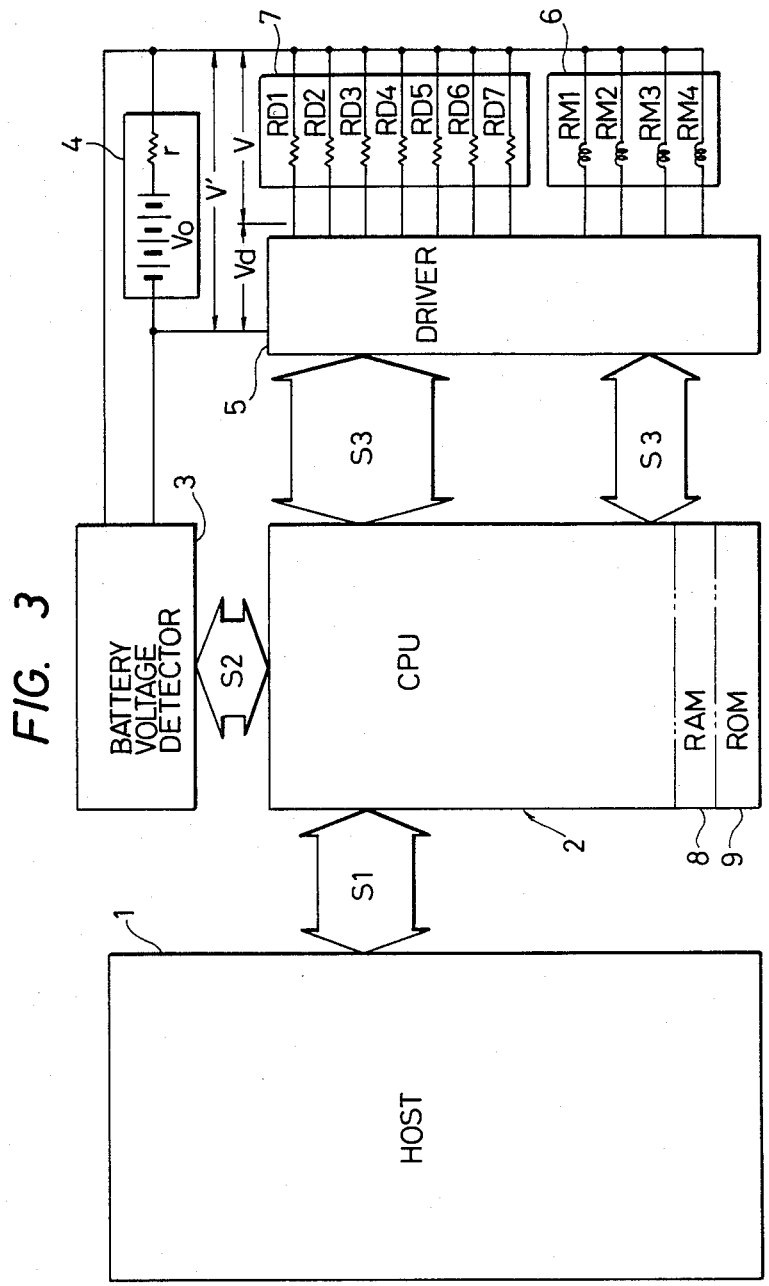
FIG. 3 shows a block diagram of a thermal printer with a print circuit in accordance with the present invention.

Referring to FIG. 3, numeral 1 denotes a host computer which has a keyboard including a plurality of keys for entering data and a print key for instructing the printing of the input data. Numeral 2 denotes a central processing unit (CPU) for controlling a thermal printer connected to the host computer 1. The CPU 2 has a RAM 8 for storing therein a coded information corresponding to the print data supplied from the host computer 1, and a voltage detected by a voltage detector to be described later, a character generator for generating a print pattern in accordance with the coded information, and a ROM 9 which stores therein a heating time table for setting an optimum heating time, e.g. voltage application time or energization time based on the power supply voltage and the number of dots to be simultaneously heated. Numeral 3 denotes the voltage detector which detects the voltage of the battery used as the power supply. Numeral 4 denotes the battery used as the power supply, having an internal resistance r. Numeral 5 denotes a driver for driving a thermal head 7 and a pulse motor 6 for moving the thermal head, which are to be described later. Numeral 7 denotes the thermal head having a plurality of heating elements or print elements. In the illustrated embodiment, the thermal head 7 has print elements RD1-RD7 arranged in a vertical line. Numeral 6 denotes the pulse motor for moving the thermal head 7. In the illustrated embodiment, it is a four-phase pulse motor. RM1-RM4 shown in the pulse motor 6 denote four-phase pulse motor windings, and S1-S3 denote signal lines.

Figure 4:
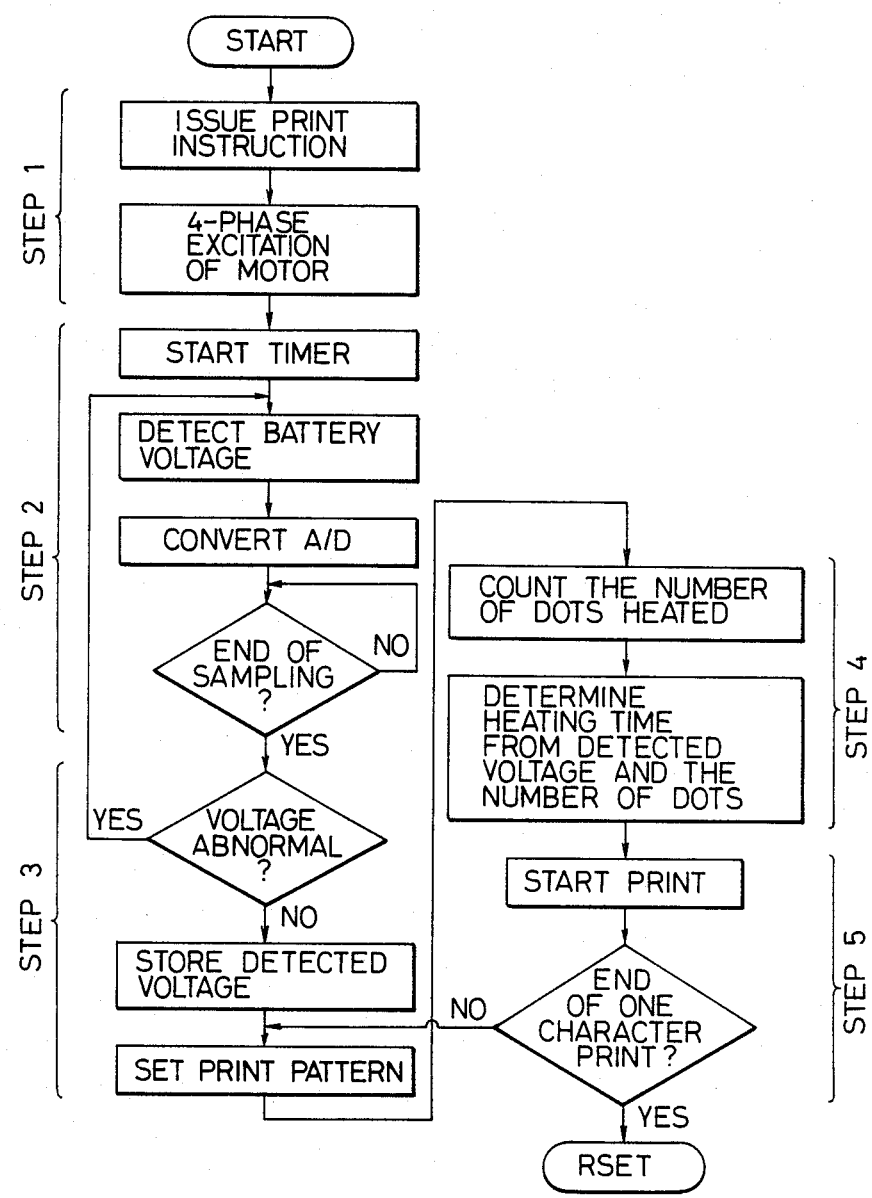
FIG. 4 shows a flow chart for explaining the operation of the thermal printer shown in FIG. 3.
Figure 5:
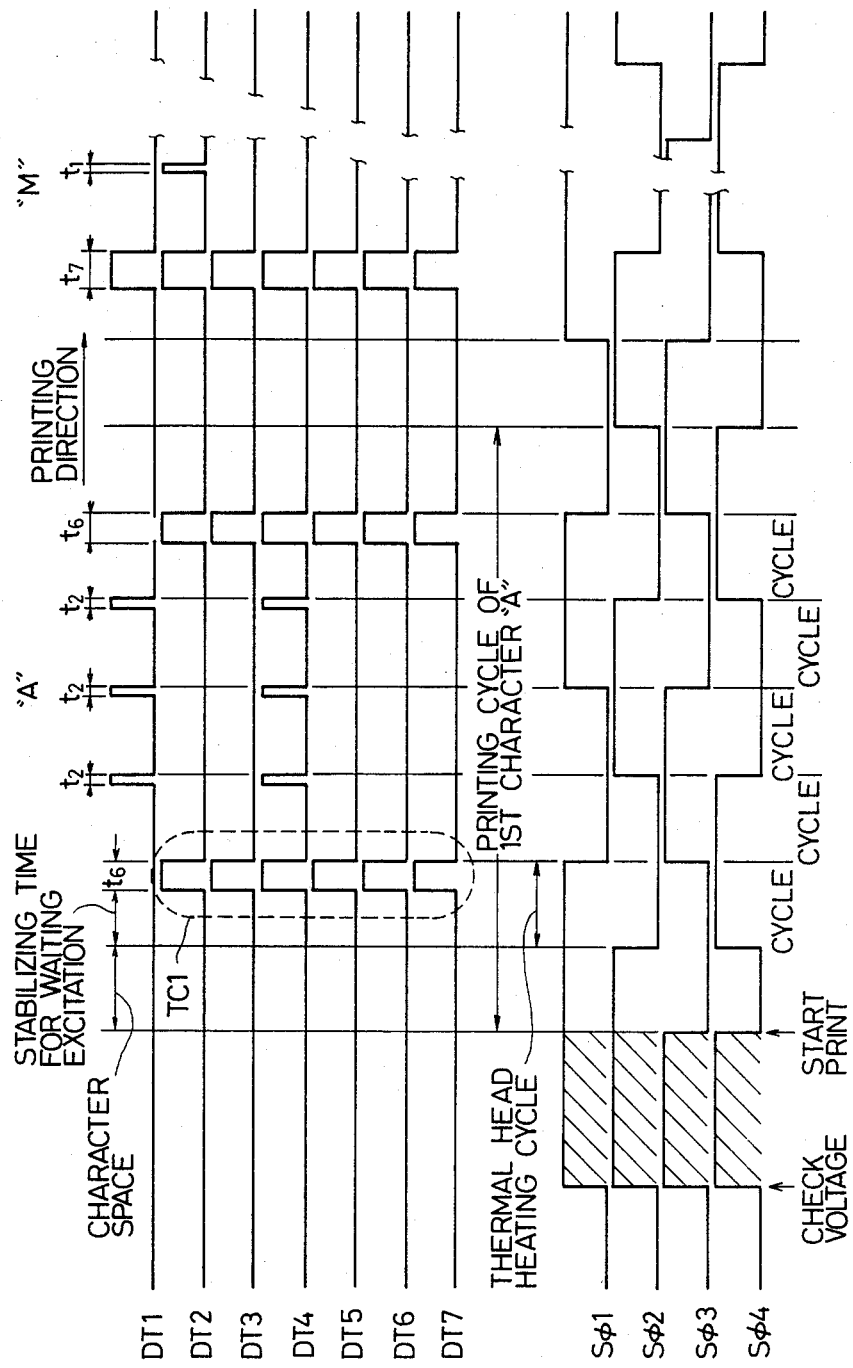
FIG. 5 shows a time chart for one embodiment of the thermal printer of the present invention.

The operation of the thermal printer thus constructed is now explained with reference to a flow chart shown in FIG. 4 and a timing chart shown in FIG. 5. As explained above, the data to be printed is entered by the input means such as the keyboard of the host computer 1 and the coded information for the input data is stored in the RAM 8. When the print key is next depressed, the host computer 1 issues a print instruction to the CPU 2 through the signal line S1. In response to the print instruction supplied from the host computer 1 through the signal line S1, the CPU 2 instructs the battery voltage detector 3 through the signal line S2 to detect the voltage of the dry battery 4. In order to apply a dummy load which is similar to a printing load, the CPU 2 issues a signal to the driver 5 through the signal line S3 to supply the output voltage of the dry battery 4 to the motor 6 to excite the four-phase motor winding RM1-RM4 of the motor 6 at a timing shown in a hatched area of the timing chart shown in FIG. 5. (Those operations correspond to a step 1 in FIG. 4.) This is based on the consideration that a load in an actual print operation comprises two phases of the motor 6 and the dots of the thermal head 7 to be simultaneously heated. The pulse motor 6 is subsequently driven by exciting the windings in a timing shown by $S\phi 1$-$S\phi 4$ in FIG. 5 to move the thermal head 7. As a reference, examples of the resistance of the pulse motor winding and the resistance of the thermal head 7 are shown in Table 1.

The dummy load is applied for several milliseconds until the voltage to be detected is stabilized and two or more samples are averaged taking a variance in the stabilized condition into consideration. In this manner, the battery voltage to a given load, or a reference voltage is detected. While not shown, the battery voltage detector 3 converts the detected voltage to a digital value by an A/D converter. (The above operations correspond to a step 2 in FIG. 4.) The detected voltage $V'$ is given by $$V' = \frac{V_0 - V_d}{1 + \frac{r}{R}} + V_d$$

where $V_d$ is a voltage drop across the driver 5 for driving the pulse motor 6 and the thermal head 7, $V_0$ is a voltage across the dry battery 4, r is the internal resistance of the dry battery 4, and R is a resistance of the thermal head 7 and the pulse motor 6.

Figure 1:
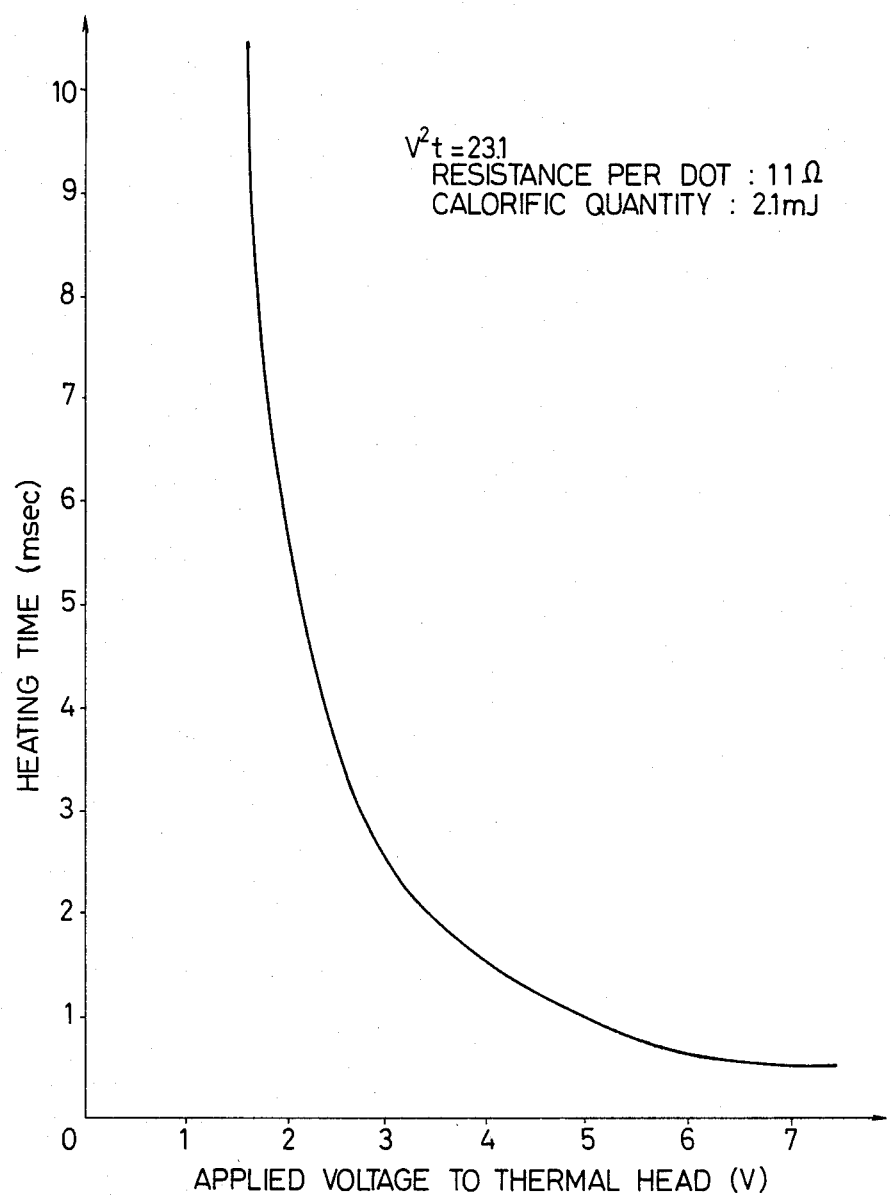
FIG. 1 shows a graph illustrating a relation between an applied voltage to a thermal head and a heating time.
Figure 2:
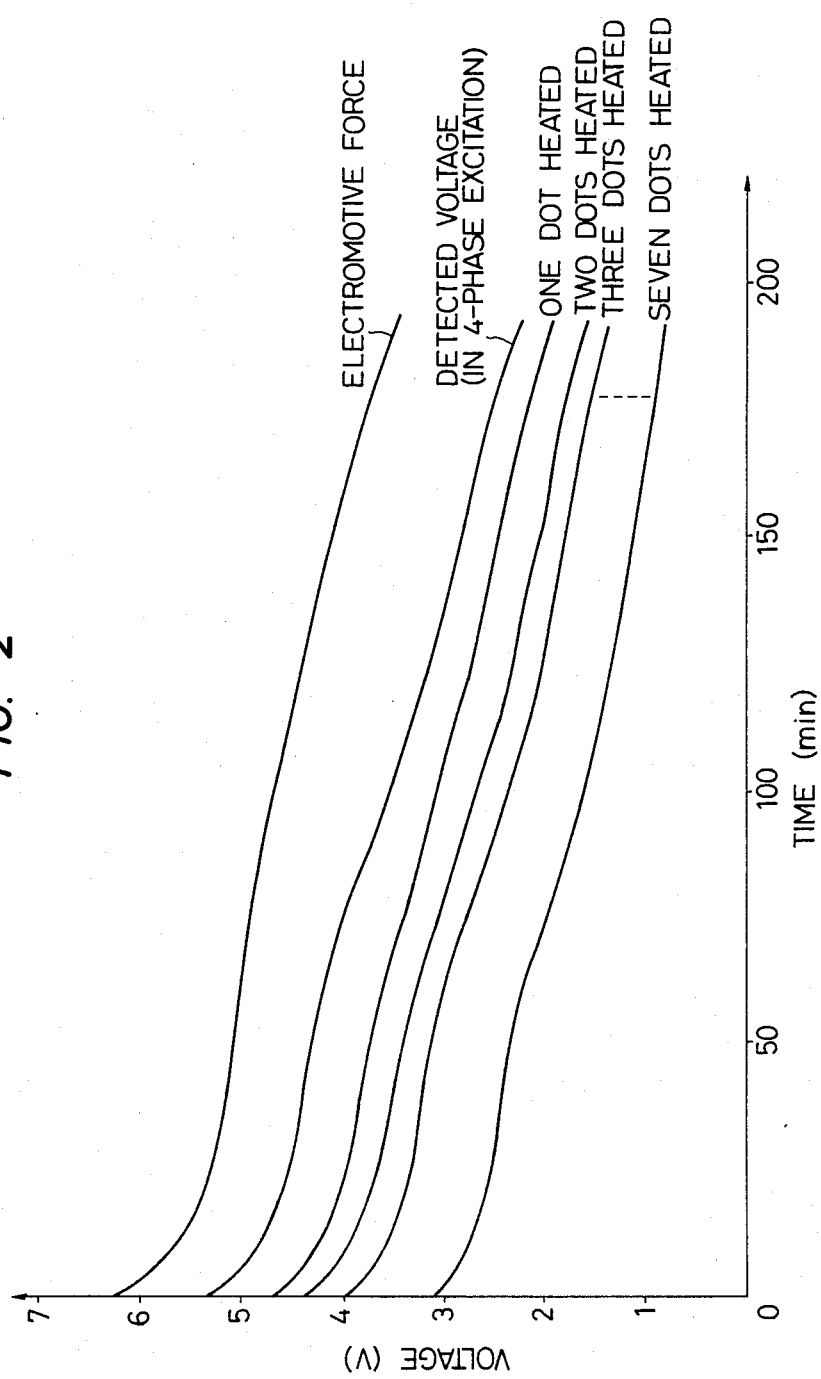
FIG. 2 shows a graph illustrating a change of the applied voltage to the thermal head by the number of dots to be simultaneously heated.
Figure 6:
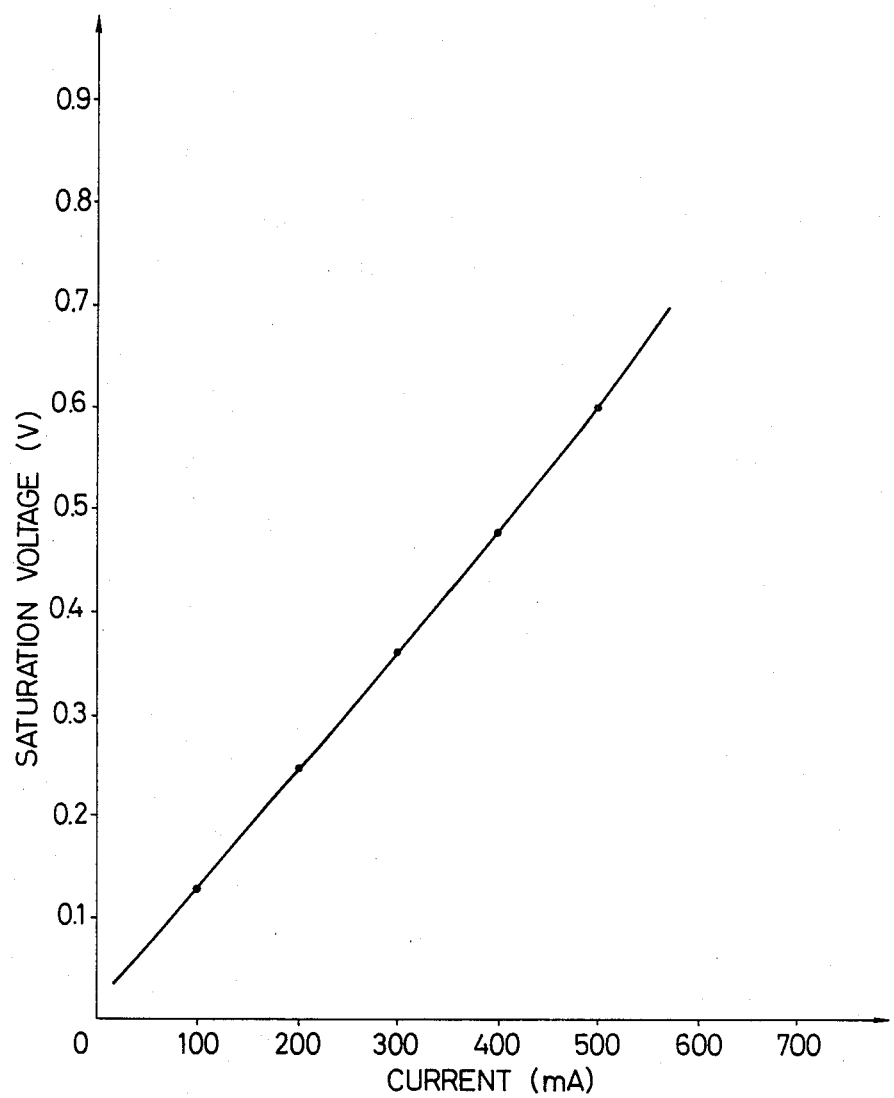
FIG. 6 shows a graph illustrating a relation between a drive current and a driver saturation voltage.

When the battery voltage detector 3 sends a detection end signal to the CPU 2, the CPU stores the detected voltage in the RAM 8. If the detected voltage sent from the battery voltage detector 3 is abnormal, for example, too high or too low, the battery voltage is detected again. The CPU 2 refers the print pattern stored in the ROM 9 having the character generator by the print code sent from the host computer 1 through the signal line S1 and stored in the RAM 8. (The above operations correspond to a step 3 in FIG. 4.) Referring to FIGS. 4 and 5, a print operation for a character "A", for example, is now explained. The CPU determines the number of dots of the print pattern which are to be first heated. As shown in FIG. 5, the number of dots to be first heated in printing the character A is six (DT2-DT7) as shown by TC1. Thus, the CPU 2 determines, based on the detected voltage, an optimum heating time $t_6$ for the six dots to be simultaneously heated from the values $t_1$, $t_2$, $t_3$, $t_4$, $t_5$, $t_6$ and $t_7$ of the heating time table stored in the ROM 9 in accordance with the graphs of the voltage versus the number of dots to be simultaneously heated and the driver saturation voltage versus current shown in FIGS. 2 and 6. (The above operations correspond to a step 4 in FIG. 4.) The heating time is calculated based on the graph shown in FIG. 1 which illustrates the relation between the applied voltage to the thermal head 7 and the heating time. Six of the resistors RD1-RD7 of the print elements of the thermal head 7 are heated through the driver 5 for the heating time $t_6$ to complete a cycle. Then, second to fourth cycles are carried out in accordance with the flow chart shown in FIG. 4 and the timing chart shown in FIG. 5 to print the character A with the uniform print density. (The above operations correspond to a step 5 in FIG. 4.)

As described hereinabove, according to the present invention, a highly uniform print density is attained. Accordingly, the present invention provides a thermal printer which meets a requirement in modern equipment of having an increasing number of dots, such as a KANJI printer or a graphic printer.

What I claim is:
1. A thermal printer, comprising:
a thermal head having a plurality of heating elements;
a power supply for supplying power to said thermal head;
power supply voltage detecting means for detecting a voltage of said power supply a predetermined number of times; and
control means for determining an average voltage of the voltages detected by said power supply voltage detecting means the predetermined number of times, and for controlling the heating value of said thermal head in accordance with said average voltage and the number of heating elements of said thermal head to be simultaneously heated in accordance with predetermined print data.

2. A thermal printer according to claim 1 wherein said power supply is a battery.

3. A thermal printer according to claim 1, wherein said control means includes first memory means for storing therein said print data and second memory means for storing therein said heating value time data determined by the number of heating elements of said thermal head to be simultaneously heated in accordance with said print data.

4. A thermal printer according to claim 3, wherein said second memory means includes a character generator storing therein a plurality of print patterns corresponding to said print data.

5. A thermal printer, comprising:
a thermal head having a plurality of heating elements;
a power supply for supplying power to said thermal head;
a motor connected to said power supply for moving said thermal head;
a power supply voltage detecting means for detecting a voltage of said power supply when the voltage of said power supply is applied to said motor as a dummy load; and
a control means for controlling the heating value of said thermal head in accordance with the voltage detected by said power supply voltage detecting means and the number of said plurality of heating elements of said thermal head to be simultaneously heated in accordance with predetermined print data.

6. A thermal printer according to claim 5, further comprising drive means for driving said thermal head when the voltage of said power supply is applied in accordance with said heating value.

7. A thermal printer according to claim 5 wherein said power supply is a battery.

8. A thermal printer according to claim 5 wherein said motor is a pulse motor.

9. A thermal printer according to claim 5 wherein said control means includes first memory means for storing therein said print data and second memory means for storing therein said heating value data determined by the number of heating elements of said thermal head to be simultaneously heated in accordance with said print data.

10. A thermal printer according to claim 9, wherein said second memory means includes a character generator storing therein a plurality of print patterns corresponding to said print data.

11. A thermal printer, comprising:
a thermal head having a plurality of heating elements;
a motor for moving said thermal head, said motor being a dummy load adapted to detect a power supply to be used;
a power supply voltage detecting means for detecting a voltage of said power supply when said voltage is applied to said motor; and
control means for controlling a heating time of said thermal head in accordance with the voltage detected by said power supply voltage detecting means and the number of said plurality of heating elements of said thermal head to be simultaneously heated in accordance with predetermined print data.

12. A thermal printer according to claim 11, wherein said motor is a pulse motor.

* * * * *

UNITED STATES PATENT AND TRADEMARK OFFICE
CERTIFICATE OF CORRECTION

PATENT NO. : 4,510,505
DATED : April 9, 1985
INVENTOR(S) : HIROSHI FUKUI

It is certified that error appears in the above-identified patent and that said Letters Patent is hereby corrected as shown below:

Column 5, line 8, delete "time".

Signed and Sealed this

Eighteenth Day of March 1986

[SEAL]

*Attest:*

DONALD J. QUIGG

*Attesting Officer*  *Commissioner of Patents and Trademarks*